(12) United States Patent
Li et al.

(10) Patent No.: US 11,923,547 B2
(45) Date of Patent: Mar. 5, 2024

(54) POSITIVE ELECTRODE PLATE, ELECTROCHEMICAL APPARATUS, AND APPARATUS

(71) Applicant: CONTEMPORARY AMPEREX TECHNOLOGY CO., LIMITED, Ningde (CN)

(72) Inventors: Jing Li, Ningde (CN); Wei Li, Ningde (CN); Qingrui Xue, Ningde (CN); Zige Zhang, Ningde (CN); Yang Zhang, Ningde (CN); Pengxiang Wang, Ningde (CN); Yang Lu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 240 days.

(21) Appl. No.: 17/501,905

(22) Filed: Oct. 14, 2021

(65) Prior Publication Data
US 2022/0037670 A1 Feb. 3, 2022

Related U.S. Application Data

(63) Continuation of application No. PCT/CN2019/129357, filed on Dec. 27, 2019.

(30) Foreign Application Priority Data

Apr. 15, 2019 (CN) .......................... 201910299473.9

(51) Int. Cl.
*H01M 4/66* (2006.01)
*H01M 4/13* (2010.01)
(Continued)

(52) U.S. Cl.
CPC .............. *H01M 4/667* (2013.01); *H01M 4/13* (2013.01); *H01M 4/622* (2013.01); *H01M 4/625* (2013.01);
(Continued)

(58) Field of Classification Search
None
See application file for complete search history.

(56) References Cited

U.S. PATENT DOCUMENTS 5,478,676 A * 12/1995 Turi ...................... H01M 4/667
429/234
2004/0126654 A1 7/2004 Sudano et al.
(Continued)

FOREIGN PATENT DOCUMENTS

CN 1855588 A 11/2006
CN 101207197 A 6/2008
(Continued)

OTHER PUBLICATIONS

Contemporary Amperex Technology Co., Limited, Extended European Search Report, EP19925225.5, dated Mar. 22, 2022, 7 pgs.
(Continued)

*Primary Examiner* — Carlos Barcena
(74) *Attorney, Agent, or Firm* — Kilpatrick Townsend & Stockton LLP

(57) ABSTRACT

This application relates to the battery field, and specifically, to a positive electrode plate, an electrochemical apparatus, and an apparatus. The positive electrode plate in this application includes a current collector and an electrode active material layer disposed on at least one surface of the current collector, where the current collector includes a support layer and a conductive layer disposed on at least one surface of the support layer. A single-sided thickness D2 of the conductive layer satisfies 30 nm≤D2≤3 μm. A thickness D1 of the support layer satisfies 1 μm≤D1≤30 μm. The support layer is made of a polymer material or a polymer composite material. The electrode active material layer includes electrode active materials, a binder, and a conductive agent.

20 Claims, 4 Drawing Sheets

(51) Int. Cl.
  *H01M 4/62* (2006.01)
  *H01M 10/0525* (2010.01)
  *H01M 4/02* (2006.01)

(52) U.S. Cl.
  CPC .......... *H01M 4/626* (2013.01); *H01M 4/661* (2013.01); *H01M 4/662* (2013.01); *H01M 4/668* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2006/0263691 A1* | 11/2006 | Park | H01M 4/131 429/231.95 |
| 2013/0171523 A1 | 7/2013 | Chen et al. | |
| 2018/0219212 A1 | 8/2018 | Seol et al. | |

FOREIGN PATENT DOCUMENTS

| | | | | |
|---|---|---|---|---|
| CN | 102306800 A | | 1/2012 | |
| CN | 102569816 A | | 7/2012 | |
| CN | 103779569 A | | 5/2014 | |
| CN | 106463698 A | | 2/2017 | |
| CN | 106654285 A | * | 5/2017 | ............ H01M 4/667 |
| CN | 106654285 A | | 5/2017 | |
| CN | 106935901 A | | 7/2017 | |
| CN | 107221676 A | | 9/2017 | |
| CN | 107925056 A | | 4/2018 | |
| CN | 108281662 A | | 7/2018 | |

OTHER PUBLICATIONS

Contemporary Amperex Technology Co., Limited, International Search Report and Written Opinion, PCT/CN2019/129357, dated Jan. 23, 2020, 17 pgs.
Office Action, CN201910299473.9, dated Aug. 18, 2020, 10 pgs.
Office Action, CN201910299473.9, dated Nov. 5, 2020, 3 pgs.
Office Action, CN201910299473.9, dated Jan. 18, 2021, 6 pgs.
Office Action, CN201910299473.9, dated Apr. 8, 2021, 5 pgs.

* cited by examiner

POSITIVE ELECTRODE PLATE, ELECTROCHEMICAL APPARATUS, AND APPARATUS

CROSS-REFERENCE TO RELATED APPLICATION

This application is a continuation application of PCT Patent Application No. PCT/CN2019/129357, entitled "POSITIVE ELECTRODE PLATE, ELECTROCHEMICAL DEVICE, AND DEVICE" filed on Dec. 27, 2019, which claims priority to Chinese Patent Application No. 201910299473.9, entitled "POSITIVE ELECTRODE PLATE, ELECTROCHEMICAL APPARATUS, AND APPARATUS" and filed on Apr. 15, 2019, all of which are incorporated herein by reference in their entirety.

TECHNICAL FIELD

This application relates to the battery field, and specifically, to a positive electrode plate, an electrochemical apparatus, and an apparatus.

BACKGROUND

Lithium-ion batteries are widely applied to electric vehicles and consumer electronic products due to their advantages such as high energy density, high output power, long cycle life, and low environmental pollution. With continuous expansion of the application scope of the lithium-ion batteries, requirements for mass energy density and volumetric energy density of the lithium-ion batteries are increasingly high. In order to obtain a lithium-ion battery with higher mass energy density and volumetric energy density, the following improvements are usually made to the lithium-ion battery: (1) selecting a positive electrode material or a negative electrode material with a high specific discharge capacity; (2) optimizing a mechanical design of the lithium-ion battery to minimize its volume; (3) selecting a positive electrode plate or a negative electrode plate with high compacted density; and (4) reducing weight of components of the lithium-ion battery.

A current collector is typically improved by selecting a lighter or thinner current collector. For example, a perforated current collector or a plastic current collector with a metal coating layer may be used. For an electrode plate and a battery using a plastic current collector with a metal coating layer, although the energy density is increased, some performance degradations may occur in processing performance, electrochemical performance, and the like. To obtain an electrode plate and a current collector with good electrochemical performance, improvements in many aspects are still required. This application is hereby proposed to overcome disadvantages in the prior art.

SUMMARY

In view of this, this application provides a positive electrode plate, an electrochemical apparatus, and an apparatus.

According to a first aspect, this application relates to a positive electrode plate, including a current collector and an electrode active material layer disposed on at least one surface of the current collector, where the current collector includes a support layer and a conductive layer disposed on at least one surface of the support layer, a single-sided thickness $D2$ of the conductive layer satisfies $30\ nm \leq D2 \leq 3$ μm, a thickness $D1$ of the support layer satisfies $1\ μm \leq D1 \leq 30$ μm, and the support layer is made of a polymer material or a polymer composite material; and the electrode active material layer includes electrode active materials, a binder, and a conductive agent, and the electrode active materials include small particle active materials with an average particle size D50 of 1.0 μm to 7.0 μm and large particle active materials with an average particle size D50 of 7.1 μm to 20.0 μm.

According to a second aspect, this application relates to an electrochemical apparatus, including a positive electrode plate, a negative electrode plate, a separator, and an electrolyte, where the positive electrode plate is the positive electrode plate in the first aspect of this application.

According to a third aspect, this application relates to an apparatus, including the electrochemical apparatus in the second aspect of this application.

The technical solutions of this application have at least the following advantageous effects.

Firstly, the positive electrode plate in this application uses a composite current collector, and therefore the energy density such as mass energy density of the electrochemical apparatus can be significantly improved.

Secondly, the positive electrode plate and the electrochemical apparatus (for example, a lithium-ion battery) including the positive electrode plate in this application further have good electrochemical performance and safety performance. The conductive layer of the positive electrode current collector in this application is relatively thin (metal burrs generated in an abnormal case such as nail penetration are also relatively small) and has relatively high internal short-circuit resistance, thereby improving nail penetration safety performance. Besides, the conductive layer of the positive electrode current collector is relatively thin and is easily damaged in the preparation process (for example, the roll-in process) of the electrode plate. The electrode active material layer in this application includes two types of active materials with different particle sizes, that is, mixed small and large particles, so that the damage to the conductive layer can be reduced in the roll-in process, thereby obtaining a current collector with good conductivity and a positive electrode plate with relatively small internal resistance and polarization and good electrochemical performance.

In addition, a protection layer is further provided on a surface of the conductive layer of the composite current collector according to some embodiments of this application, so that the damage to the conductive layer during electrode plate processing is further reduced, and the conductivity of the composite current collector and the electrochemical performance of the positive electrode plate are improved.

In addition, according to the positive electrode plate in some embodiments of this application, a conductive primer layer including a conductive material and a binder is also additionally disposed between the current collector and the electrode active material layer. The conductive primer layer can further reduce the damage to the conductive layer during electrode plate processing, and by effectively mending and constructing a conductive network among the current collector, the conductive primer layer, and the active material, it is possible to improve electron transfer efficiency, and reduce resistance between the current collector and the electrode active material layer, thereby well overcoming disadvantages such as poor conductivity of the composite current collector and damage vulnerability of the conductive layer in the composite current collector. In this way, the internal direct current resistance in the electrode assembly can be effectively reduced, the power performance of the electrode assembly is improved, and it is ensured that the electrode assembly is not prone to phenomena such as relatively large polarization and lithium precipitation during long-term cycling. That is, the long-term reliability of the electrode assembly is effectively improved.

In addition, the binder content of the electrode active material layer of the positive electrode plate according to some preferred embodiment of this application is not less than 1 wt %, preferably, not less than 1.5 wt %, and more preferably, not less than 2 wt %, so that binding force between the active material layer and the composite current collector is strong, so that the active material layer can effectively wrap metal burrs generated in the conductive layer in abnormal cases such as nail penetration, thereby improving nail penetration safety performance of the battery.

The apparatus in this application includes the electrochemical apparatus in the second aspect of this application, and therefore has at least the same advantages as the electrochemical apparatus.

Therefore, the positive electrode plate and electrochemical apparatus in this application have good and balanced electrochemical performance, safety performance, and machinability, and relatively high energy density.

BRIEF DESCRIPTION OF DRAWINGS

A positive electrode plate, an electrochemical apparatus, an apparatus, and advantageous effects thereof in this application are described in detail with reference to the accompanying drawings and embodiments as follows.

Figure 1:
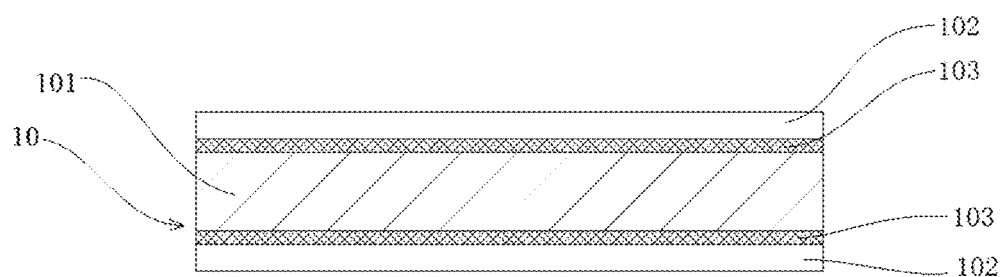
FIG. 1 is a schematic structural diagram of a positive electrode current collector according to an embodiment of this application.

In which,
PP. positive electrode plate;
   10. positive electrode current collector;
      101. positive electrode current collector support layer;
      102. positive electrode current collector conductive layer;
      103. positive electrode current collector protection layer;
   11. conductive primer layer;
   12. positive electrode active material layer;
1. battery pack;
2. upper box body;
3. lower box body;
4. battery module; and
5. electrochemical apparatus.

DESCRIPTION OF EMBODIMENTS

This application is further described with reference to embodiments as follows. It should be understood that these embodiments are merely intended to illustrate this application but not to limit the scope of this application.

The first aspect of this application relates to a positive electrode plate, including a current collector and an electrode active material layer disposed on at least one surface of the current collector, where the current collector includes a support layer and a conductive layer disposed on at least one surface of the support layer. A single-sided thickness D2 of the conductive layer satisfies 30 nm≤D2≤3 μm. A thickness D1 of the support layer satisfies 1 μm≤D1≤30 μm, and the support layer is made of a polymer material or a polymer composite material. The electrode active material layer includes electrode active materials, a binder, and a conductive agent. And the electrode active materials include small particle active materials with an average particle size D50 of 1.0 μm to 7.0 μm and large particle active materials with an average particle size D50 of 7.1 μm to 20.0 μm.

The positive electrode current collector used for the positive electrode plate in the first aspect of this application is a composite current collector made of at least two materials. Structurally, the current collector includes a support layer and a conductive layer disposed on at least one surface of the support layer. The single-sided thickness D2 of the conductive layer satisfies 30 nm≤D2≤3 μm, and the thickness D1 of the support layer satisfies 1 μm≤D1≤30 μm. Therefore, it is the conductive layer of the current collector that serves for conducting electricity. The thickness D2 of the conductive layer is far less than a thickness of a common metal current collector such as Al foil in the prior art (the thickness of the common metal current collector: Al foil is generally 12 μm). And the support layer is made of a polymer material or a polymer composite material. Therefore, mass energy density of an electrochemical apparatus (for example, a lithium battery) using the electrode plate can be increased. In addition, when serving as a positive electrode current collector, the composite current collector can also greatly improve nail penetration safety performance of the positive electrode plate. The conductive layer of the positive electrode current collector is relatively thin, and therefore relatively small metal burrs are generated in an abnormal case such as nail penetration. In addition, due to the presence of the support layer, its short circuit internal resistance is relatively large, so it is less likely to cause a short circuit.

However, due to a relatively thin conductive layer of this composite current collector, compared with the conventional metal current collector (Al foil), the composite current collector has poorer conductivity, and the conductive layer is prone to damage in the electrode plate preparation process (for example, electrode plate roll-in), thereby affecting the conductivity performance of the conductive layer and the electrochemical performance of the electrochemical apparatus. In addition, the support layer (polymer material or polymer composite material) of the composite current collector has a greater degree of rebound than traditional metal current collectors in electrode plate roll-in and other processes, so both the binding force between the support layer and the conductive layer and the binding force between the composite current collector and the electrode active material layer preferably need to be strengthened by improving the interface. Therefore, in a process of applying the foregoing composite current collector to an electrochemical apparatus, some technical improvements are required.

According to the positive electrode plate in this application, the electrode active material layer is specially designed, so that both the positive electrode plate including the composite current collector, and the electrochemical apparatus (for example, the lithium-ion battery) including the positive electrode plate in this application have high energy density, and good electrochemical performance and safety performance.

Specifically, the electrode active material layer in this application includes a combination of two types of active materials with different particle sizes, that is, small particle active materials with an average particle size D50 of 1.0 μm to 7.0 μm and large particle active materials with an average particle size D50 of 7.1 μm to 20.0 μm, so that the damage to the conductive layer can be reduced in the roll-in process, thereby obtaining a positive electrode plate with relatively small internal resistance and polarization and good electrochemical performance.

According to some embodiments of this application, a conductive primer layer including a conductive material and a binder is additionally disposed between the current collector and the electrode active material layer. Specifically, the conductive primer layer is disposed between the conductive layer of the current collector and the electrode active material layer. The conductive primer layer can further reduce the damage to the conductive layer in the electrode plate preparation process, improve the interface between the composite current collector and the electrode active material layer, strengthen the binding force between the current collector and the electrode active material layer, and ensure that the electrode active material layer is more firmly disposed on the surface of the composite current collector. In addition, by effectively mending and constructing a conductive network among the current collector, the conductive primer layer and the active material, the conductive primer layer can improve the electron transfer efficiency, reduce the resistance of the electrode plate including the composite current collector, and overcome the shortcomings such as poor conductivity of the composite current collector and damage vulnerability of the conductive layer in the composite current collector, thereby effectively reducing the internal direct current resistance (DCR) in the electrode assembly, improving the power performance of the electrode assembly, and ensuring that the electrode assembly is not prone to phenomena such as relatively large polarization and lithium precipitation during long-term cycling, that is, effectively improving the long-term reliability of the electrode assembly.

A structure, a material, performance, and the like of the positive electrode plate (and the current collector therein) in the embodiments of this application are described in detail as follows.

[Conductive Layer of the Current Collector]

Compared with a conventional metal current collector, in the current collector according to an embodiment of this application, the conductive layer has a conductive function and a current collection function, and is configured to provide electrons for the electrode active material layer.

The material of the conductive layer is selected from at least one of a metal conductive material and a carbon-based conductive material.

The metal conductive material is preferably selected from at least one of aluminum, nickel, titanium, silver, and aluminum-zirconium alloy.

The carbon-based conductive material is preferably selected from at least one of graphite, acetylene black, graphene, and a carbon nanotube.

The material of the conductive layer is preferably made of a metal conductive material, that is, the conductive layer is preferably a metal conductive layer. When the current collector is a positive electrode current collector, aluminum is usually used as the material of the conductive layer.

When the conductive layer has poor conductivity or a too small thickness, the internal resistance and polarization of the battery are relatively large. When the conductive layer is too thick, an effect of improving mass energy density and volumetric energy density of the battery cannot be achieved.

The single-sided thickness of the conductive layer is D2. D2 preferably satisfies 30 nm≤D2≤3 μm, more preferably, 300 nm≤D2≤2 μm, and most preferably, 500 nm≤D2≤1.5 μm, to better ensure light weight and good conductivity of the current collector.

In a preferred embodiment of this application, an upper limit of the single-sided thickness D2 of the conductive layer may be 3 μm, 2.5 μm, 2 μm, 1.8 μm, 1.5 μm, 1.2 μm, 1 μm, and 900 nm, and a lower limit of the single-sided thickness D2 of the conductive layer may be 800 nm, 700 nm, 600 nm, 500 nm, 450 nm, 400 nm, 350 nm, 300 nm, 100 nm, 50 nm, and 30 nm. A range of the single-sided thickness D2 of the conductive layer may be composed of any values of the upper limit or the lower limit. Preferably, 300 nm≤D2≤2 μm; and more preferably, 500 nm≤D2≤1.5 μm.

Because the thickness of the conductive layer in this application is relatively small, damage such as cracks is prone to occur in a process such as production of the electrode plate. Generally, cracks exist in the conductive layer of the positive electrode plate in this application. The cracks in the conductive layer usually exist irregularly in the conductive layer. The cracks may be elongated cracks, cross-shaped cracks, divergent cracks, and the like, or the cracks may be cracks that penetrate the entire conductive layer, or may be formed on the surface of the conductive layer. The cracks in the conductive layer are usually caused by roll-in during the electrode plate processing, excessive amplitude during tab welding, excessive reeling tension of a substrate, and the like.

The conductive layer may be formed on the support layer through at least one of mechanical roll-in, bonding, vapor deposition, and electroless plating. The vapor deposition method is preferably physical vapor deposition (PVD). The physical vapor deposition method is preferably at least one of an evaporating method and a sputtering method. The evaporating method is preferably at least one of vacuum evaporating, thermal evaporation deposition, and electron beam evaporation method (EBEM). The sputtering method is preferably magnetron sputtering.

Preferably, at least one of vapor deposition and electroless plating is used, so that the support layer and the conductive layer are more tightly bonded.

[Support Layer of the Current Collector]

In the current collector in an embodiment of this application, the support layer has functions of supporting and protecting the conductive layer. Since the support layer generally uses an organic polymer material or a polymer composite material, density of the support layer is usually lower than density of the conductive layer, which can significantly increase the mass energy density of the battery compared with a conventional metal current collector.

In addition, the conductive layer uses a relatively thinner metal layer, which can further increase the mass energy density of the battery. In addition, because the support layer can well support and protect the conductive layer on a surface of the support layer, a common fracture phenomenon of an electrode plate in the conventional current collector is not prone to occur.

The material of the support layer may be specifically selected from at least one of an insulation polymer material, an insulation polymer composite material, a conductive polymer material, and a conductive polymer composite material.

The insulation polymer material is, for example, selected from at least one of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), ethylene propylene rubber, polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, and polyethylene glycol and its cross-linked products.

The insulation polymer composite material is, for example, selected from a composite material formed of an insulation polymer material and an inorganic material, where the inorganic material is preferably at least one of a ceramic material, a glass material, and a ceramic composite material.

The conductive polymer material is, for example, selected from a polysulfur nitride polymer material or a doped conjugated polymer material, such as at least one of polypyrrole, polyacetylene, polyaniline, and polythiophene.

The conductive polymer composite material is, for example, selected from a composite material formed of an insulation polymer material and a conductive material. The conductive material is selected from at least one of a conductive carbon material, a metal material, and a composite conductive material. The conductive carbon material is selected from at least one of carbon black, carbon nanotube, graphite, acetylene black, or graphene. The metal material is selected from at least one of nickel, iron, copper, aluminum and alloy of the foregoing metal. And the composite conductive material is selected from at least one of nickel-coated graphite powder and nickel-coated carbon fiber.

A person skilled in the art can appropriately select and determine the material of the support layer based on an actual need of the application environment, costs and other factors. In this application, the material of the support layer is preferably an insulation polymer material or an insulation polymer composite material, especially when the current collector is a positive electrode current collector.

When the current collector is a positive electrode current collector, the safety performance of the battery can be significantly improved by using a special current collector supported by an insulation layer and having a conductive layer with a specific thickness. Because the insulation layer is non-conductive, its resistance is relatively large, which can increase the short-circuit resistance when the battery is short-circuited in an abnormal case, and greatly reduce the short-circuit current. Therefore, heat generated by the short circuit can be greatly reduced, thereby improving the safety performance of the battery. In addition, the conductive layer is relatively thin, so that in an abnormal case such as nail penetration, a local conductive network is cut off, preventing a large area of the electrochemical apparatus or even the entire electrochemical apparatus from being short-circuited. This can limit the damage of the electrochemical apparatus caused by nail penetration to a penetrated site, only forming a "point disconnection" without affecting the normal operation of the electrochemical apparatus within a period of time.

The thickness of the support layer is D1, and D1 preferably satisfies 1 μm≤D1≤30 μm, and more preferably, 1 μm≤D1≤15 μm.

Under the condition of that the support layer is too thin, the mechanical strength of the support layer is insufficient, and breakage easily occurs during the process such as the electrode plate preparation process. Under the condition of that the support layer is too thick, the volumetric energy density of the battery using the current collector is reduced.

The upper limit of the thickness D1 of the support layer may be 30 μm, 25 μm, 20 μm, 15 μm, 12 μm, 10 μm, and 8 μm, and a lower limit may be 1 μm, 1.5 μm, 2 μm, 3 μm, 4 μm, 5 μm, 6 μm, and 7 μm; and a range of the thickness D1 of the support layer may be composed of any values of the upper limit or the lower limit. Preferably, 1 μm≤D1≤15 μm, more preferably, 2 μm≤D1≤10 μm, and most preferably, 3 μm≤D1≤8 μm.

In addition, the specified thickness in this application can further ensure that the current collector has relatively large resistance, and significantly reduce a battery temperature increase when a short circuit occurs in the battery. When the conductive layer is made of aluminum, this can further significantly reduce or prevent a thermite reaction of the positive electrode current collector, and ensure good safety performance of the battery.

In addition, when the conductive layer is a metal conductive layer, a room-temperature Young's modulus of the support layer preferably satisfies 20 GPa≥E≥4 GPa.

In this application, a method for testing the room-temperature Young's modulus of the support layer is as follows:

A support layer sample is taken and cut into a size of 15 mm×200 mm. A thickness h (μm) of the sample is measured with a micrometer. A Gotech tensile machine is used under room temperature and pressure to carry out a tensile test. An initial position is set, and the sample is retained 50 mm in length between clamps. Stretching is carried out at a speed of 50 mm/min. Load L (N) and displacement y (mm) of the equipment are recorded when the sample is stretched to break. In this case, stress ε=L/(15×h)×1000, and strain η=y/50×100. A stress-strain curve is drawn, and a curve in an initial linear zone is taken, where a slope of this curve is the Young's modulus E.

Since metal is more rigid than polymer or polymer composite materials, that is, the deformation is smaller during the roll-in process of the electrode plate processing. In order to ensure that a deformation difference between the support layer and the conductive layer is not too large to tear the conductive layer, the room-temperature Young's modulus of the support layer should preferably satisfy: 20 GPa≥E≥4 GPa, so that the support layer can have a rigidity, and the rigidity matching between the support layer and the conductive layer can be further improved. This ensures that the difference in the deformations of the support layer and the conductive layer will not be too large during the processing of the current collector and the electrode plate.

Since the support layer has a rigidity (20 GPa≥E≥4 GPa), the current collector is not easy to deform or stretch too much during the processing of the current collector and the electrode plate, so that the support layer and the conductive layer are firmly bonded and not easily separated, so as to prevent damage to the conductive layer caused by the conductive layer being "forced" to stretch. In addition, the current collector in this application has some tenacity, thereby ensuring that the current collector and the electrode plate have some capabilities to withstand deformation and are not prone to strip breakage.

However, the Young's modulus of the support layer cannot be too large; otherwise, the rigidity is too strong, which causes difficulties in reeling and winding, and poor processability. When 20 GPa≥E, it can be ensured that the support layer has some flexibility, and the electrode plate can also withstand deformation to some extent.

In addition, a thermal shrinkage of the support layer at 90° C. is preferably not more than 1.5%, to better ensure the thermal stability of the current collector during the processing of the electrode plate.

[Protection Layer of the Current Collector]

In some embodiments of this application, the current collector is further provided with a protection layer. The protection layer is disposed on one surface of the conductive layer of the current collector or disposed on two surfaces of the conductive layer of the current collector, that is, a surface of the conductive layer farther away from the support layer and a surface facing toward the support layer.

The protection layer may be a metal protection layer or a metal oxide protection layer. The protection layer can prevent the conductive layer of the current collector from being damaged by chemical corrosion or mechanical damage, and can also enhance the mechanical strength of the current collector.

Preferably, the protection layer is disposed on two surfaces of the conductive layer of the current collector. A lower protection layer of the conductive layer (that is, the protection layer disposed on the surface of the conductive layer facing toward the support layer) can not only prevent damage to the conductive layer and enhance the mechanical strength of the current collector, but also enhance the binding force between the support layer and the conductive layer to prevent peeling (that is, the separation of the support layer from the conductive layer).

The technical effect of an upper protection layer of the conductive layer (that is, the protection layer disposed on the surface of the conductive layer farther away from the support layer) is mainly to prevent the conductive layer from being damaged, corroded, and the like during processing (for example, both electrolyte infiltration and roll-in affect the surfaces of the conductive layer).

In virtue of the good conductivity, the metal protection layer can not only further improve the mechanical strength and corrosion resistance of the conductive layer, but also reduce the polarization of the electrode plate. The material of the metal protection layer is, for example, selected from at least one of nickel, chromium, a nickel-based alloy, and a copper-based alloy, and preferably, nickel or a nickel-based alloy.

The nickel-based alloy is an alloy formed by adding one or more other elements to pure nickel as the matrix. Preferably, it is a nickel-chromium alloy. The nickel-chromium alloy is an alloy formed of metallic nickel and metallic chromium. Optionally, the molar ratio of nickel to chromium ranges from 1:99 to 99:1.

The cooper-based alloy is an alloy formed by adding one or more other elements to a pure cooper matrix. Preferably, it is a copper-nickel alloy. Optionally, in the copper-nickel alloy, a molar ratio of nickel to copper ranges from 1:99 to 99:1.

When a metal oxide is selected for the protection layer, due to its low ductility, large specific surface area, and high hardness, it can also effectively support and protect the conductive layer, and have a good technical effect on improving the binding force between the support layer and the conductive layer. The material of the metal oxide protection layer is, for example, selected from at least one of aluminum oxide, cobalt oxide, chromium oxide, and nickel oxide.

The composite current collector according to this application preferably uses a metal oxide as a material of its protection layer to further improve safety performance of the positive electrode plate and battery while achieving a good technical effect of support and protection.

The thickness of the protection layer is $D3$, and $D3$ preferably satisfies $D3 \leq \frac{1}{10} D2$, and 1 nm≤$D3$≤200 nm. Under the condition of that the protection layer is too thin, it is not enough to protect the conductive layer. Under the condition of that the protection layer is too thick, the mass energy density and the volumetric energy density of the battery are reduced. More preferably, 5 nm≤$D3$≤500 nm, even more preferably, 10 nm≤$D3$≤200 nm, and most preferably, 10 nm≤$D3$≤50 nm.

The materials of the protection layers on the two surfaces of the conductive layer may be the same or different, and the thicknesses of the protection layers may be the same or different.

Preferably, the thickness of the lower protection layer is less than the thickness of the upper protection layer to help improve the mass energy density of the battery.

Further optionally, the ratio of the thickness $D3''$ of the lower protection layer to the thickness $D3'$ of the upper protection layer is: $\frac{1}{2} D3' \leq D3'' \leq \frac{4}{5} D3'$.

When the current collector is a positive electrode current collector, aluminum is usually used as the material of the conductive layer, and a metal oxide material is preferably selected for the lower protection layer. Compared with the choice of metal used for the lower protection layer, the metal oxide material has larger resistance. Therefore, this type of lower protection layer can further increase the resistance of the positive electrode current collector to some extent, thereby further increasing the short circuit resistance of the battery in the event of a short circuit in an abnormal case, and improving the safety performance of the battery. In addition, because the specific surface area of the metal oxide is larger, the binding force between the lower protection layer of the metal oxide material and the support layer is enhanced. Moreover, because the specific surface area of the metal oxide is larger, the lower protection layer can increase the roughness of the support layer surface, and enhance the binding force between the conductive layer and the support layer, thereby increasing the overall strength of the current collector. Therefore, when the current collector is a positive electrode current collector, the lower protection layer is preferably made of a metal oxide material, and the upper protection layer is made of a metal material or a metal oxide material. The upper protection layer is preferably also made of a metal oxide material.

[Current Collector]

FIG. 1 to FIG. 4 are schematic structural diagrams of current collectors used in a positive electrode plate according to some embodiments of this application.

Schematic diagrams of the positive electrode current collectors are shown in FIG. 1 to FIG. 4.

In FIG. 1, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protection layers 103 that are disposed on lower surfaces of the positive electrode current collector conductive layers 102 (that is, surfaces facing toward the positive electrode current collector support layer 101), that is, lower protection layers.

Figure 2:
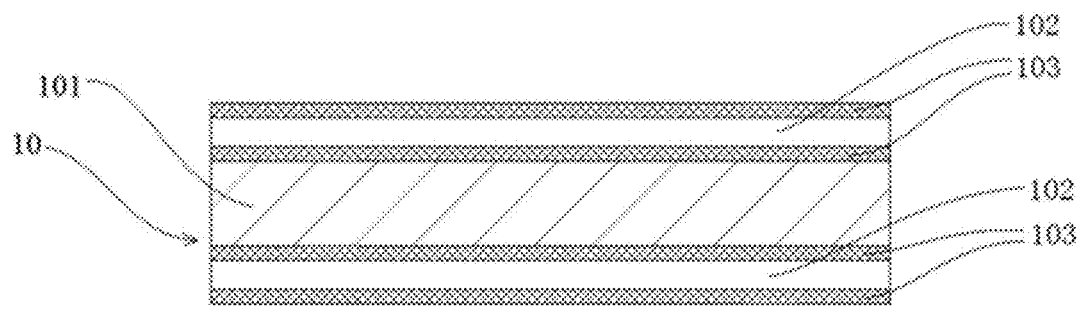
FIG. 2 is a schematic structural diagram of a positive electrode current collector according to another embodiment of this application.

In FIG. 2, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protection layers 103 that are disposed on two opposite surfaces of the positive electrode current collector conductive layer 102, that is, a lower protection layer and an upper protection layer.

Figure 3:
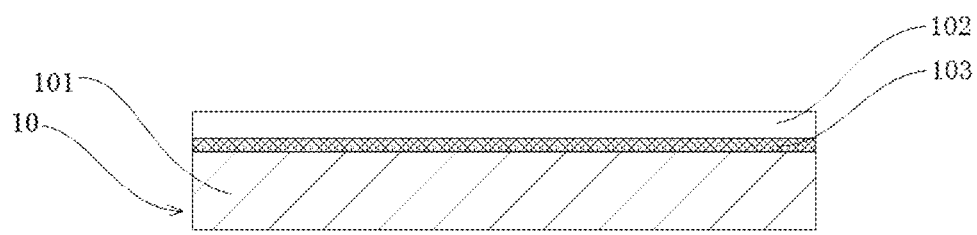
FIG. 3 is a schematic structural diagram of a positive electrode current collector according to another embodiment of this application.

In FIG. 3, a positive electrode current collector 10 includes a positive electrode current collector support layer 101 and a positive electrode current collector conductive layer 102 that is disposed on one surface of the positive electrode current collector support layer 101, and further includes a positive electrode current collector protection layer 103 that is disposed on a surface of the positive electrode current collector conductive layer 102 facing toward the positive electrode current collector support layer 101, that is, a lower protection layer.

Figure 4:
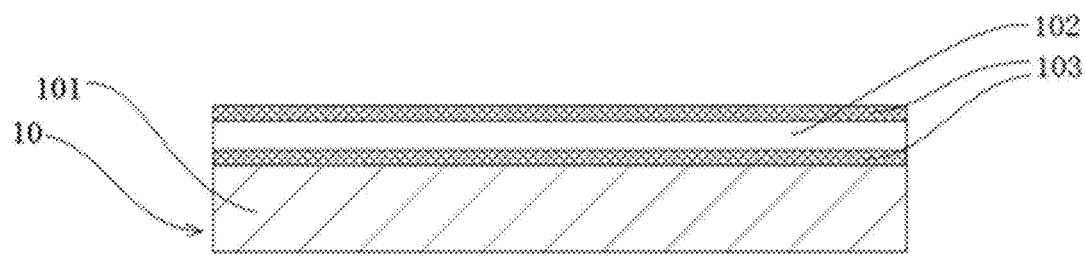
FIG. 4 is a schematic structural diagram of a positive electrode current collector according to another embodiment of this application.

In FIG. 4, a positive electrode current collector 10 includes a positive electrode current collector support layer 101 and a positive electrode current collector conductive layer 102 that is disposed on one surface of the positive electrode current collector support layer 101, and further includes positive electrode current collector protection layers 103 that are disposed on two opposite surfaces of the positive electrode current collector conductive layer 102, that is, a lower protection layer and an upper protection layer.

The materials of the protection layers on the two opposite surfaces of the conductive layer may be the same or different, and the thicknesses of the protection layers may be the same or different.

For the current collectors used for the positive electrode plate according to this application, a conductive layer may be separately disposed on two opposite surfaces of the support layer, as shown in FIG. 1 and FIG. 2; or a conductive layer may be disposed on only one surface of the support layer, as shown in FIG. 3 and FIG. 4.

In addition, although the composite current collector used for the positive electrode plate in this application preferably includes the protection layer of the current collector shown in FIG. 1 to FIG. 4, it should be understood that the protection layer of the current collector is not a necessary structure of the current collector. In some embodiments, the used current collector may not include the protection layer of the current collector.

[Electrode Active Material Layer of Positive Electrode Plate]

The electrode active material layer generally includes an electrode active material, a binder, and a conductive agent. The electrode active material layer may further include other optional additives or auxiliaries as needed.

As an important feature of the positive electrode plate in this application, the electrode active materials in the electrode active material layer include a combination of small and large particles. Specifically, the electrode active materials include small particle active materials with an average particle size D50 of 1.0 μm to 7.0 μm and large particle active materials with an average particle size D50 of 7.1 μm to 20.0 μm.

D50 is a corresponding particle size when a cumulative volume percentage of the active material reaches 50%, that is, a median particle size in volume distribution. For example, D50 may be measured by using a laser diffraction particle size distribution measuring instrument (for example, Malvern Mastersizer 3000).

Preferably, a mass ratio of the small particle active materials to the large particle active materials ranges from 1:9 to 9:1.

For the positive electrode plate in this application, various electrode active materials (that is, positive electrode active materials) commonly used in the art may be selected. For example, for lithium batteries, the positive electrode active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, and the like. However, this application is not limited to these materials, and may further use other conventional well-known materials that can be used as positive electrode active materials of the lithium-ion battery. One type of these positive electrode active materials may be used alone, or two or more types may be used in combination. Preferably, the positive electrode active material may be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ (LFP), and $LiMnPO_4$.

In some embodiments of this application, the small particle active materials and the large particle active materials are different active materials, and more preferably, are a combination of active materials with high thermal stability and active materials with high electrochemical capacity. The active materials with high thermal stability are, for example, NCM333, NCM523, and LFP; and the active materials with high electrochemical capacity are, for example, NCM811, and NCM622.

The conductive agent in the electrode active material layer is at least one of a conductive carbon material and a metal material. The conductive carbon material is selected from at least one of zero-dimensional conductive carbon such as acetylene black or conductive carbon black, one-dimensional conductive carbon such as carbon nanotube, two-dimensional conductive carbon such as conductive graphite or graphene, and three-dimensional conductive carbon such as reduced graphene oxide, and the metal material is selected from at least one of aluminum powder, iron powder, and silver powder.

The binder in the electrode active material layer is selected from at least one of styrene butadiene rubber, oily polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, and polyacrylate-polyacrylonitrile copolymer.

In addition, for the positive electrode plate in this application, when the binder content of the electrode active material layer is relatively high, there is a relatively strong binding force between the active material layer and the composite current collector. Therefore, in an abnormal case such as nail penetration, the active material layer can effectively wrap metal burrs generated in the conductive layer, to improve nail penetration safety performance of the battery. Therefore, in terms of further improving the battery safety, it is preferable that based on the total weight of the electrode active material layer, the binder content of the electrode active material layer is not less than 1 wt %, preferably, not less than 1.5 wt %, and more preferably, not less than 2 wt %. When the binder content is maintained within a given range, the binding force between the active material layer and the current collector is relatively strong. And as a result, in an abnormal case such as nail penetration, the active material layer can effectively wrap the metal burrs generated in the conductive layer to improve the nail penetration safety performance of the battery.

It is known to a person skilled in the art that the needed positive electrode active material layer is obtained by applying slurry made of the electrode active material, the conductive agent, and the binder onto the positive electrode current collector (or onto the primer layer of the positive electrode current collector in advance), and then performing post-processing such as drying.

[Conductive Primer Layer of a Positive Electrode Plate]

According to some embodiments of this application, a conductive primer layer is also additionally disposed between the current collector and the electrode active material layer of the positive electrode plate. The conductive primer layer includes a conductive material and a binder. The conductive primer layer can not only further reduce the damage to the conductive layer during the electrode plate processing, but also improve the interface of the composite current collector, strengthen the adhesive force between the current collector and the electrode active material layer, and ensure that the electrode active material layer is more firmly disposed on the surface of the composite current collector. In addition, by effectively mending and constructing a conductive network between the current collector and the active material of the electrode active material layer, the conductive primer layer can further improve the electron transfer efficiency, reduce the resistance between the current collector and the electrode active material layer, and overcome the shortcomings such as poor conductivity of the composite current collector and damage vulnerability of the conductive layer in the composite current collector, thereby effectively reducing the internal direct current resistance in the electrode assembly, improving the power performance of the electrode assembly, and ensuring that the electrode assembly is not prone to phenomena such as relatively large polarization and lithium precipitation during long-term cycling, that is, effectively improving the long-term reliability of the electrode assembly.

Based on a total weight of the conductive primer layer, a weight percentage of a conductive material ranges from 10% to 99%, preferably, from 20% to 80%, and more preferably, from 50% to 80%; and a weight percentage of the binder ranges from 1% to 90%, preferably, from 20% to 80%, and more preferably, from 20% to 50%. The percentage can help to improve the conductivity of the positive electrode plate and strengthen the binding force between the current collector and the electrode active material layer.

Preferably, the conductive primer layer may further include an electrode active material. When the electrode active material is included, electrochemical capacity of the positive electrode plate can be increased.

A margin other than the conductive material and the binder may be the electrode active material. In a preferred embodiment of this application, based on a total weight of the conductive primer layer, conductive material content preferably ranges from 10 wt % to 98 wt %, a binder content preferably ranges from 1 wt % to 89 wt %, and electrode (positive electrode) active material content preferably ranges from 1 wt % to 89 wt %.

The conductive material may be at least one of a conductive carbon material and a metal material. The conductive material in the conductive primer layer may be identical to or different from the conductive agent in the active material layer.

The conductive carbon material is selected from at least one of zero-dimensional conductive carbon (for example, acetylene black or conductive carbon black), one-dimensional conductive carbon (for example, carbon nanotube), two-dimensional conductive carbon (for example, conductive graphite or graphene), and three-dimensional conductive carbon (for example, reduced graphene oxide); and the metal material is selected from at least one of aluminum powder, iron powder, and silver powder.

A preferred conductive material includes a one-dimensional conductive carbon material or a two-dimensional conductive carbon material. After the two-dimensional conductive carbon material is added, the two-dimensional conductive carbon material in the conductive primer layer can come into "horizontal sliding" during the compaction of the electrode plate, achieving a function of buffering, reducing the damage to the conductive layer of the current collector during the compaction, and reducing cracks. Preferably, a particle size D50 of the two-dimensional conductive carbon material ranges from 0.01 μm to 0.1 μm. Preferably, the two-dimensional conductive carbon material accounts for 1 wt % to 50 wt % of the conductive material. In addition, due to the special morphology of the one-dimensional conductive carbon material, the conductivity of the conductive primer layer can be improved after addition. Especially when a specified amount of the conductive material is added, compared with other types of conductive materials, the one-dimensional conductive carbon material can better improve the conductivity of the conductive primer layer. Preferably, carbon nanotube is used, and an aspect ratio of the carbon nanotube preferably ranges from 1000 to 5000.

A preferable conductive material is a mixed material of a zero-dimensional conductive carbon material and a one-dimensional conductive carbon material or a mixed material of a zero-dimensional conductive carbon material and a two-dimensional conductive carbon material.

The binder in the conductive primer layer may be identical to or different from the binder in the active material layer.

The binder in the conductive primer layer is selected from at least one of styrene butadiene rubber, oily polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, and polyacrylate-polyacrylonitrile copolymer.

The binder in the conductive primer layer is preferably an aqueous binder, for example, at least one of aqueous PVDF, acrylic acid, polyurethane, polyvinyl alcohol, polyacrylate, polyacrylic acid-polyacrylonitrile copolymer, and polyacrylate-polyacrylonitrile copolymer. In this way, DCR of the electrochemical apparatus does not increase significantly. In this application, an "aqueous" polymer material means that the polymer molecular chain is fully extended and dispersed in water, and an "oily" polymer material means that the polymer molecular chain is fully extended and dispersed in an oily solvent. Those skilled in the art understand that the same type of polymer material can be dispersed in water and oil respectively by using suitable surfactants, that is, by using suitable surfactants, the same type of polymer material can be made into an aqueous polymer material and an oily polymer material respectively. For example, a person skilled in the art can replace PVDF with aqueous PVDF or oily PVDF as needed.

The electrode active material in the conductive primer layer may be identical to or different from the electrode active material in the active material layer. Various electrode active materials (that is, positive electrode active materials) commonly used in the art may be selected as the electrode active material in the conductive primer layer.

A single-sided thickness H of the conductive primer layer preferably ranges from 0.1 μm to 5 μm. Preferably, H/D2 ranges from 0.5:1 to 5:1. Under the condition of that the ratio is too small, the cracks in the conductive layer cannot be effectively reduced or the conductivity of the electrode plate cannot be effectively improved; or under the condition of that the ratio is too large, not only the mass energy density of the battery is reduced, but also the DCR of the battery is increased, which is not conducive to improvement of the kinetic performance of the battery.

[Positive Electrode Plate]

Figure 5:
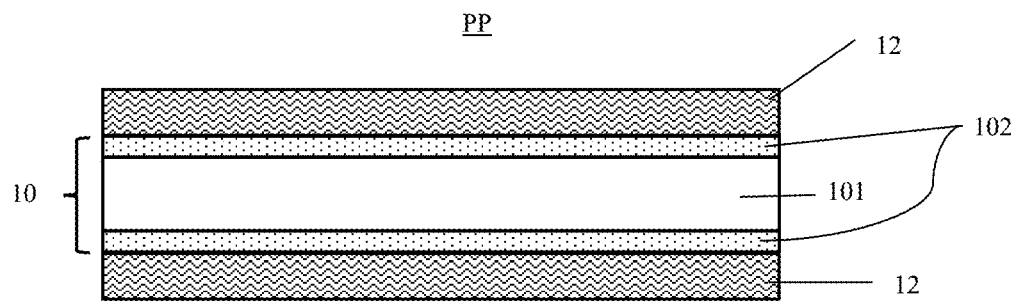
FIG. 5 is a schematic structural diagram of a positive electrode plate according to an embodiment of this application.
Figure 6:
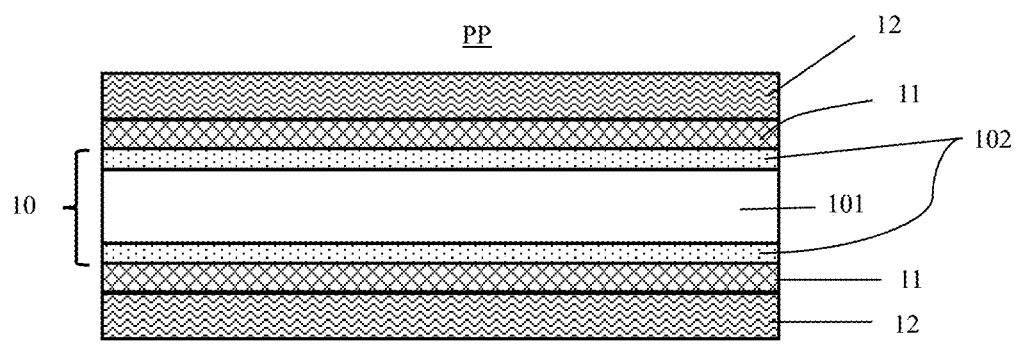
FIG. 6 is a schematic structural diagram of a positive electrode plate according to another embodiment of this application.
Figure 7:
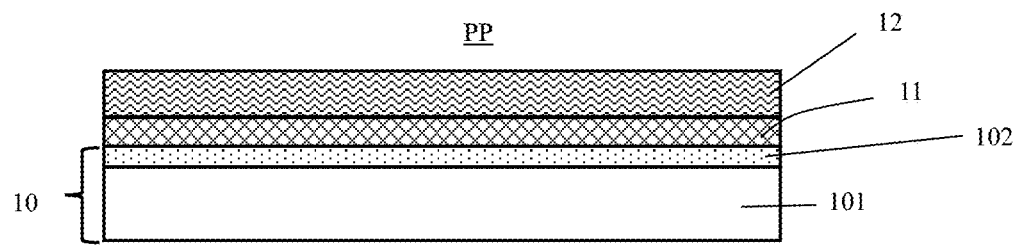
FIG. 7 is a schematic structural diagram of a positive electrode plate according to another embodiment of this application.

FIG. 5 to FIG. 7 are schematic structural diagrams of a positive electrode plate according to some embodiments of this application.

In FIG. 5, a positive electrode plate PP includes a positive electrode current collector 10 and positive electrode active material layers 12 that are disposed on two opposite surfaces of the positive electrode current collector 10. The positive electrode current collector 10 includes a positive electrode current collector support layer 101, and positive electrode current collector conductive layers 102 that are disposed on two opposite surfaces of the positive electrode current collector support layer 101.

In FIG. 6, the positive electrode plate PP includes a positive electrode current collector 10 and conductive primer layers 11 and positive electrode active material layers 12 that are disposed on two opposite surfaces of the positive electrode current collector 10. The positive electrode current collector 10 includes a positive electrode current collector support layer 101 and positive electrode current collector conductive layers 102 that are disposed on two opposite surfaces of the positive electrode current collector support layer 101.

In FIG. 7, the positive electrode plate PP includes a positive electrode current collector 10 and a conductive primer layer 11 and a positive electrode active material layer 12 that are disposed on one surface of the positive electrode current collector 10. The positive electrode current collector 10 includes a positive electrode current collector support layer 101 and a positive electrode current collector conductive layer 102 that is disposed on one surface of the positive electrode current collector support layer 101.

As shown in FIG. 5 and FIG. 7, the electrode active material layer may be disposed on one surface of the current collector, or may be disposed on two surfaces of the current collector.

A person skilled in the art can understand that, when a current collector provided with double-sided conductive layers is used, the positive electrode plate may be obtained through double-sided coating (that is, electrode active material layers are disposed on two surfaces of the current collector), or only single-sided coating (that is, the electrode active material layer is only disposed on one surface of the current collector); and when the current collector provided with only a single-sided conductive layer is used, the positive electrode plate may be obtained only through single-sided coating, and the electrode active material layer (and the conductive primer layer) may be applied only on one surface of the current collector provided with the conductive layer.

[Electrochemical Apparatus]

The second aspect of this application relates to an electrochemical apparatus, including a positive electrode plate, a negative electrode plate, a separator, and an electrolyte, where the positive electrode plate is the positive electrode plate according to the first aspect of this application.

The electrochemical apparatus may be a capacitor, a primary battery, or a secondary battery. For example, the electrochemical apparatus may be a lithium-ion capacitor, a lithium-ion primary battery, or a lithium-ion secondary battery. A method for constructing and preparing the electrochemical apparatus is well known, except the positive electrode plate used in this application. Because the positive electrode plate in this application is used, the electrochemical apparatus can have high energy density, improved safety (for example, nail penetration safety) and electrochemical performance. In addition, because the positive electrode plate in this application can be easily processed, manufacturing costs of the electrochemical apparatus using the positive electrode plate in this application can be reduced.

In the electrochemical apparatus in this application, none of the negative electrode plate, the separator, and the electrolyte is specifically limited to a specific type and composition, and may be selected based on an actual requirement. Specifically, the separator may be selected from a polyethylene film, a polypropylene film, a polyvinylidene fluoride film, and a multilayer composite film thereof. When the battery is a lithium-ion battery, a non-aqueous electrolyte is generally used as its electrolyte. As the non-aqueous electrolyte, a lithium salt solution dissolved in an organic solvent is generally used. The lithium salt is, for example, an inorganic lithium salt such as $LiClO_4$, $LiPF_6$, $LiBF_4$, $LiAsF_6$, or $LiSbF_6$, or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ (n≥2). The organic solvent used in the non-aqueous electrolyte is, for example, cyclic carbonate such as ethylene carbonate, propylene carbonate, butylene carbonate, and vinylene carbonate, chain carbonate such as dimethyl carbonate, diethyl carbonate, and methyl ethyl carbonate, chain ester such as methyl propionate, cyclic ester such as γ-butyrolactone, chain ether such as dimethoxyethane, diethyl ether, diethylene glycol dimethyl ether, and triethylene glycol dimethyl ether, cyclic ether such as tetrahydrofuran and 2-methyltetrahydrofuran, nitrile such as acetonitrile and propionitrile, or a mixture of these solvents. For the negative electrode plate, various negative electrode active materials commonly used in the art may be selected. For example, for the lithium battery, a negative electrode active material may be selected from carbon materials such as graphite (artificial graphite or natural graphite), conductive carbon black, and carbon fiber, metal or semi-metal materials such as Si, Sn, Ge, Bi, Sn, and In, and their alloys, lithium-containing nitrides or lithium-containing oxides, lithium metal or lithium aluminum alloys, and the like.

In some embodiments, the electrochemical apparatus may include an outer package for encapsulating the positive electrode plate, the negative electrode plate, and an electrolyte. In an example, the positive electrode plate, the negative electrode plate, and the separator may be laminated or wound to form an electrode assembly with a laminated structure or an electrode assembly with a wound structure, and the electrode assembly is encapsulated in an outer package. The electrolyte may be a liquid electrolyte, and the liquid electrolyte infiltrates into the electrode assembly. There may be one or more electrode assemblies in the electrochemical apparatus, and a quantity of the electrode assemblies may be adjusted as required.

In some embodiments, the outer package of the electrochemical apparatus may be a soft package, for example, a soft bag. A material of the soft package may be plastic, for example, may include one or more of polypropylene (PP), polybutylene terephthalate (PBT), polybutylene succinate (PBS), and the like. Alternatively, the outer package of the electrochemical apparatus may be a hard shell, for example, an aluminum shell.

Figure 9:
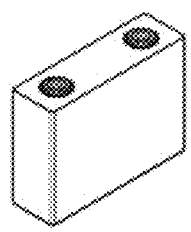
FIG. 9 is a schematic diagram of an embodiment of an electrochemical apparatus according to this application.

This application sets no particular limitation on a shape of the electrochemical apparatus, and the electrochemical apparatus may have a cylindrical, square, or any other shape. FIG. 9 shows an electrochemical apparatus 5 with a square structure as an example.

In some embodiments, electrochemical apparatuses may be assembled into a battery module, and the battery module may include a plurality of electrochemical apparatuses. A specific quantity may be adjusted based on application and capacity of the battery module.

Figure 10:
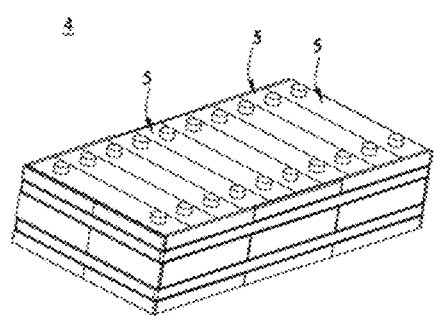
FIG. 10 is a schematic diagram of an embodiment of a battery module according to this application.

FIG. 10 shows a battery module 4 used as an example. Referring to FIG. 10, in a battery module 4, a plurality of electrochemical apparatuses 5 may be arranged in sequence in a length direction of the battery module 4. Certainly, the electrochemical apparatuses may alternatively be arranged in any other manner. Furthermore, the plurality of electrochemical apparatuses 5 may be fastened by using fasteners.

Optionally, the battery module 4 may further include a housing with accommodating space, and the plurality of electrochemical apparatuses 5 are accommodated in the accommodating space.

In some embodiments, battery modules may be further assembled into a battery pack, and a quantity of battery modules included in the battery pack may be adjusted based on application and capacity of the battery pack.

Figure 11:
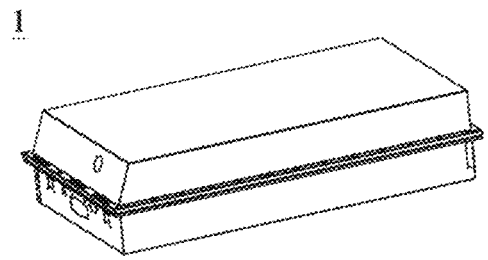
FIG. 11 is a schematic diagram of an embodiment of a battery pack according to this application.
Figure 12:
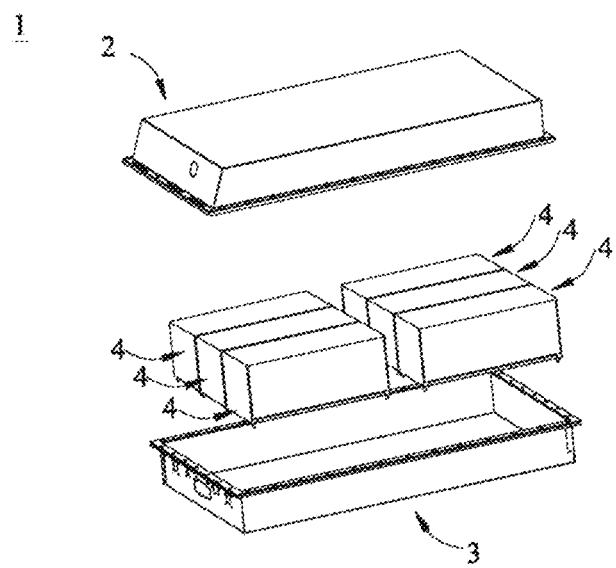
FIG. 12 is an exploded view of FIG. 11.

FIG. 11 and FIG. 12 show a battery pack 1 as an example. Referring to FIG. 11 and FIG. 12, the battery pack 1 may include a battery box and a plurality of battery modules 4 arranged in the battery box. The battery box includes an upper box body 2 and a lower box body 3. The upper box body 2 can cover the lower box body 3 to enclose a space for accommodating the battery modules 4. The plurality of battery modules 4 may be arranged in the battery box in any manner.

[Apparatus]

The third aspect of this application relates to an apparatus, including the electrochemical apparatus according to the second aspect of this application. The electrochemical apparatus provides power to the apparatus. The apparatus may be, but is not limited to, a mobile device (for example, a mobile phone or a laptop), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like. In addition, the electric train, the ship, and the satellite all are carrying tools and belong to vehicle in a broad sense.

The electrochemical apparatus, a battery module, or a battery pack may be selected for the apparatus according to use requirements for the apparatus.

Figure 13:
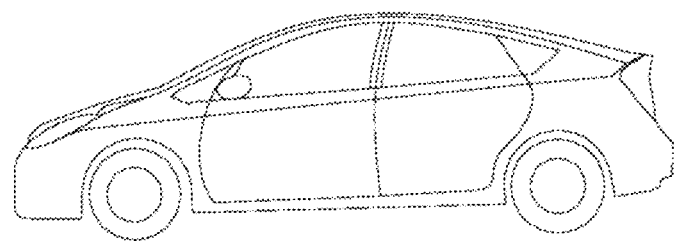
FIG. 13 is a schematic diagram of an embodiment of an apparatus using an electrochemical apparatus as a power source according to this application.

FIG. 13 shows an apparatus as an example. The apparatus is a battery electric vehicle, a hybrid electric vehicle, a plug-in hybrid electric vehicle, or the like. To meet a requirement of the apparatus for high power and high energy density of the electrochemical apparatus, a battery pack or a battery module may be used.

In another example, the apparatus may be a mobile phone, a tablet computer, a laptop, or the like. The apparatus usually requires to be light and thin, and the electrochemical apparatus may be used as a power source.

A person skilled in the art may understand that the foregoing limitations or preferred ranges of component selection, component content, and material physicochemical performance parameters in electrode plates, electrode active material layers, and the like in different embodiments of this application may be randomly combined, and various embodiments obtained through the combination can still fall within the scope of this application and can be considered as a part of content disclosed in this specification.

Unless otherwise specified, various parameters in this specification have general meanings well known in the art, and may be measured by using a method well known in the art. For example, a test may be conducted in a method provided in an embodiment of this application. In addition, preferred ranges and options of different parameters provided in various preferred embodiments may be randomly combined, and it is considered that various combinations obtained can fall within the disclosed scope of this application.

The following further describes advantageous effects of this application with reference to examples.

Examples

1. Preparation of a Current Collector without a Protection Layer:

A support layer with a specific thickness was selected, and a conductive layer with a specific thickness was formed on a surface of the support layer through vacuum evaporating, mechanical roll-in, or bonding.

(1) The forming conditions of the vacuum evaporation method are as follows: The support layer subjected to surface cleaning treatment was placed into a vacuum evaporation chamber, and high-purity metal wires in the metal evaporation chamber were melted and evaporated at a high temperature of 1600° C. to 2000° C. The evaporated metal went through the cooling system in the vacuum evaporation chamber, and finally was deposited on the surface of the support layer to form a conductive layer.

(2) The forming conditions of the mechanical roll-in method are as follows: The foil of the conductive layer material was placed in a mechanical roller, and compacted to a predetermined thickness through rolling by applying a pressure of 20 t to 40 t, and then placed onto the surface of the support layer on which a surface cleaning processing had been performed. Finally, the two were placed in the mechanical roller to be tightly bonded by applying a pressure of 30 t to 50 t.

(3) The forming conditions of the bonding method are as follows: The foil of the conductive layer material was placed in a mechanical roller, and rolling compacted to a predetermined thickness by applying a pressure of 20 t to 40 t, and then the surface of the support layer subjected to a surface cleaning treatment was coated with a mixed solution of PVDF and NMP. Finally, the conductive layer of the predetermined thickness was adhered to the surface of the support layer, and dried at 100° C.

2. Preparation of a Current Collector with a Protection Layer

The current collector with the protection layer may be prepared in the following manners:

(1) Firstly, a protection layer was disposed on a surface of a support layer by using a vapor deposition method or a coating method, and then a conductive layer with a specified thickness was formed on the surface of the support layer with the protection layer through vacuum evaporating, mechanical roll-in, or bonding to prepare a current collector with a protection layer (the protection layer was located between the support layer and the conductive layer). In addition, on the basis of the above, another protection layer was formed on the surface of the conductive layer farther away from the support layer by using a vapor deposition method, an in-situ formation method, or a coating method to prepare a current collector with protection layers (the protection layers were located on two opposite surfaces of the conductive layer).

(2) Firstly, a protection layer was formed on one surface of the conductive layer by using a vapor deposition method, an in-situ formation method, or a coating method, and then the above conductive layer with the protection layer was disposed on the surface of the support layer through mechanical roll-in or bonding, with the protection layer located between the support layer and the conductive layer, to prepare a current collector with a protection layer (the protection layer was located between the support layer and the conductive layer). In addition, on the basis of the above, another protection layer was formed on the surface of the conductive layer farther away from the support layer by using a vapor deposition method, an in-situ formation method, or a coating method to prepare a current collector with protection layers (the protection layers were located on two opposite surfaces of the conductive layer).

(3) Firstly, a protection layer was formed on one surface of the conductive layer by using a vapor deposition method, an in-situ formation method, or a coating method, and then the above conductive layer with the protection layer was disposed on the surface of the support layer through mechanical roll-in or bonding, with the protection layer located on the surface of the conductive layer farther away from the support layer, to prepare a current collector with a protection layer (the protection layer was located on the surface of the conductive layer farther away from the support layer).

(4) Firstly, protection layers were formed on two surfaces of the conductive layer by using a vapor deposition method, an in-situ formation method, or a coating method, and then the above conductive layer with the protection layers was disposed on the surface of the support layer through mechanical roll-in or bonding to prepare a current collector with protection layers (the protection layers were located on two opposite surfaces of the conductive layer).

(5) On the basis of the above "preparation of a current collector without a protection layer", another protection layer was formed on the surface of the conductive layer farther away from the support layer by using a vapor deposition method, an in-situ formation method, or a coating method to prepare a current collector with a protection layer (the protection layer was located on the surface of the conductive layer farther away from the support layer).

In the preparation examples, for the vapor deposition method, a vacuum evaporating method was used; for the in-situ formation method, an in-situ passivation method was used; and for the coating method, a blade coating method was used.

The forming conditions of the vacuum evaporation method are as follows: A sample subjected to a surface cleaning treatment was placed into a vacuum evaporation chamber, and the protection layer material in the evaporation chamber was melted and evaporated at a high temperature of 1600° C. to 2000° C. The evaporated protection layer material went through the cooling system in the vacuum evaporation chamber, and finally was deposited on the surface of the sample to form a protection layer.

The forming conditions of the in-situ passivation method are as follows: The conductive layer was placed in a high-temperature oxidation environment, the temperature was controlled within 160° C. to 250° C., the oxygen supply was maintained in the high-temperature environment, and the processing time was 30 minutes, thereby forming a metal oxide type protection layer.

The formation conditions of the gravure coating method are as follows: The protection layer material and NMP were stirred and mixed, and then a slurry with the above protection layer material (solid content ranged from 20% to 75%) was applied on a surface of the sample, and then the thickness of the coating was controlled by a gravure roller, and finally the coating was dried at 100° C. to 130° C.

3. Preparation of an Electrode Plate:

(1) Positive Electrode Plate in an Example (with a Conductive Primer Layer):

A conductive material (for example, conductive carbon black) and a binder (for example, PVDF or polyacrylic acid) were dissolved in a suitable solvent (for example, NMP or water) in a specific proportion, and stirred well to form a primer slurry.

The primer slurry was evenly applied on two surfaces of the composite current collector prepared according to the above method at a coating speed 20 m/min. The primer layer was dried with an oven temperature of 70° C. to 100° C. for 5 minutes.

After the primer layer was dried completely, a 92 wt % positive electrode active material (if no specific material was specified, NCM333 was used by default), a 5 wt % conductive agent Super-P ("SP" for short), and a 3 wt % PVDF were mixed with a solvent NMP, and stirred well to prepare a positive electrode active material layer slurry (composition of the active material layer slurry in some examples might vary, and in this case, specified composition in the examples should prevail). Extrusion coating was performed to apply the positive electrode active material layer slurry on the surface of the primer layer, and drying was performed at 85° C. to obtain a positive electrode active material layer.

Then the current collector having various coating layers was cold-pressed and cut, and dried for four hours in an 85° C. vacuum condition, and tabs were welded, thereby obtaining a positive electrode plate.

(2) Positive Electrode Plate in an Example (without a Conductive Primer Layer):

It was prepared by using a method similar to the method for preparing a positive electrode plate (with a conductive primer layer) in the foregoing example. However, a positive electrode active material layer slurry was directly applied on a surface of a composite current collector, and no primer layer was disposed.

(3) Conventional Positive Electrode Plate:

A current collector was Al foil with a thickness of 12 μm. Similar to the method for preparing a positive electrode plate (without a conductive primer layer), a positive electrode active material layer slurry was directly applied on the surface of the Al foil current collector, and then a conventional positive electrode plate was obtained through post-processing.

(4) Conventional Negative Electrode Plate:

A negative electrode active material artificial graphite, a conductive agent Super-P, a thickener CMC, and a binder SBR were added to the deionized water solvent at a mass ratio of 96.5:1.0:1.0:1.5, and well mixed to prepare a negative electrode active material layer slurry. Extrusion coating was performed to apply the negative electrode active material layer slurry on two surfaces of Cu foil with a thickness of 8 μm (negative electrode current collector), and drying was performed at 85° C. to obtain a negative electrode active material layer. Then post-processing was performed to obtain a conventional negative electrode plate.

4. Preparation of a Battery:

Through a common battery manufacturing process, a positive electrode plate (compacted density: 3.4 g/cm$^3$), a PP/PE/PP separator, and a negative electrode plate (compacted density: 1.6 g/cm$^3$) were wound together to form a battery assembly, then the electrode assembly was placed into a battery housing, the electrolyte (an EC:EMC volume ratio was 3:7, and LiPF$_6$ was 1 mol/L) was injected, and then sealing, formation, and other processes were performed to finally obtain a lithium-ion secondary battery (hereinafter referred to as the battery).

5. Battery Testing Method:

(1) Lithium-Ion Battery Cycle Life Testing Method:

The lithium-ion battery was charged and discharged at 45° C. That is, the lithium-ion battery was charged to 4.2 V at a current of 1 C, and then discharged to 2.8 V at a current of 1 C, and the discharge capacity during the initial cycle was recorded. 1000 cycles of 1 C/1 C charge and discharge were then performed on the battery, and the discharge capacity of the battery during a $1000^{th}$ cycle was recorded. The discharge capacity during the $1000^{th}$ cycle was divided by the discharge capacity during the initial cycle to obtain the capacity retention rate during the $1000^{th}$ cycle.

(2) DCR Growth Rate Testing Method:

At 25° C., the secondary battery was adjusted to 50% SOC at a current of 1 C, and a voltage U1 was recorded. Then the battery was discharged at a current of 4 C for 30 seconds, and a voltage U2 was recorded. DCR=(U1−U2)/4 C. Then the battery was charged and discharged for 500 cycles at a current of 1 C/1 C, and DCR in a $500^{th}$ cycle was recorded. The DCR in the $500^{th}$ cycle was divided by the DCR in the initial cycle, then 1 was subtracted, and a DCR growth rate in the $500^{th}$ cycle was obtained.

(3) Needle Penetration Test:

The secondary batteries (10 samples) were fully charged to the cut-off voltage at a current of 1 C, and then charged at a constant voltage until the current dropped to 0.05 C, and then charging was stopped. A φ8 mm high temperature resistant steel needle was used to penetrate at a speed of 25 mm/s from a direction perpendicular to a battery electrode plate, and the penetration position needed to be close to the geometric center of the punctured surface. Whether the battery had a phenomenon of burning and explosion while the steel needle stayed in the battery was observed.

(4) Rate Performance (Discharge Capacity Retention Rate at 4 C):

After the secondary battery was fully discharged, the battery was fully charged at 0.33 C, charged to 0.05 C at a constant voltage of 4.2 V, and then fully discharged at 0.33 C. A full discharge capacity $C_0$ at 0.33 C was recorded, and then the battery was fully charged at 0.33 C, charged to 0.05 C at a constant voltage of 4.2 V, and fully discharged at 4 C. A full discharge capacity $C_1$ at 4 C was recorded. The capacity retention rate at the discharge rate was $C_1/C_0$.

6. Test Results and Discussion:

6.1 Effect of a Composite Current Collector on Improvement of Mass Energy Density of a Battery Specific parameters of the current collector and the electrode plate in the examples are shown in Table 1 (no current collector in the examples listed in Table 1 is provided with a protection layer). In Table 1, the weight percentage of the current collector refers to a percentage obtained by dividing the weight of the positive electrode current collector per unit area by the weight of the conventional positive electrode current collector per unit area.

TABLE 1

| Electrode plate number | Current collector number | Support layer Material | Support layer D1 | Conductive layer Material | Conductive layer D2 | Current collector thickness | Weight percentage of current collector |
|---|---|---|---|---|---|---|---|
| Positive electrode plate 1 | Positive electrode current collector 1 | PI | 6 μm | Al | 300 nm | 6.6 μm | 30.0% |
| Positive electrode plate 2 | Positive electrode current collector 2 | PET | 4 μm | Al | 500 nm | 5 μm | 24.3% |
| Positive electrode plate 3 | Positive electrode current collector 3 | PET | 2 μm | Al | 200 nm | 2.4 μm | 11.3% |

TABLE 1-continued

| Electrode plate number | Current collector number | Support layer Material | D1 | Conductive layer Material | D2 | Current collector thickness | Weight percentage of current collector |
|---|---|---|---|---|---|---|---|
| Positive electrode plate 4 | Positive electrode current collector 4 | PET | 10 μm | Al | 1 μm | 12 μm | 56.5% |
| Positive electrode plate 5 | Positive electrode current collector 5 | PET | 10 μm | Al | 1.5 μm | 13 μm | 65% |
| Positive electrode plate 6 | Positive electrode current collector 6 | PET | 10 μm | Al | 2 μm | 14 μm | 73.5% |
| Conventional positive electrode plate | Conventional positive electrode current collector | / | / | Al | / | 12 μm | 100% |

It may be learned from Table 1 that, compared with the conventional current collector (Al, 12 μm), the weight of the positive electrode current collector according to this application was reduced to some degree, thereby improving the mass energy density of the battery. However, when the thickness of the conductive layer was greater than 1.5 μm, the weight reduction degree of the current collector became smaller.

In addition, the effect of improving nail penetration safety of the battery by the composite current collector was also studied. Table 1-1 shows composition of tested positive electrode plate (none of the electrode plates is provided with a conductive primer layer), and Table 1-2 shows nail penetration test results.

TABLE 1-1

| Electrode plate number | Support layer Material | Thickness D1 | Conductive layer Material | Single-sided thickness D2 | Electrode active material layer Material | Single-sided thickness D4 |
|---|---|---|---|---|---|---|
| Positive electrode plate 11 | PI | 2 μm | Al | 800 nm | NCM811 | 55 μm |
| Positive electrode plate 12 | PI | 5 μm | Al | 2 μm | NCM811 | 55 μm |
| Positive electrode plate 13 | PI | 6 μm | Al | 300 nm | NCM811 | 55 μm |
| Positive electrode plate 14 | PET | 5 μm | Al | 500 nm | NCM811 | 55 μm |
| Positive electrode plate 15 | PET | 10 μm | Al | 1 μm | NCM811 | 55 μm |
| Positive electrode plate 16 | PET | 8 μm | Al | 1.5 μm | NCM811 | 55 μm |

TABLE 1-2

| Battery number | Positive electrode plate | Negative electrode plate | Nail penetration test result |
|---|---|---|---|
| Battery 60 | Conventional positive electrode plate | Conventional negative electrode plate | All failed |
| Battery 61 | Positive electrode plate 11 | Conventional negative electrode plate | All passed |
| Battery 62 | Positive electrode plate 12 | Conventional negative electrode plate | All passed |
| Battery 63 | Positive electrode plate 13 | Conventional negative electrode plate | All passed |
| Battery 64 | Positive electrode plate 14 | Conventional negative electrode plate | All passed |
| Battery 65 | Positive electrode plate 15 | Conventional negative electrode plate | All passed |
| Battery 66 | Positive electrode plate 16 | Conventional negative electrode plate | All passed |

Because a lithium-ion battery using the composite current collector had a thinner conductive layer than the conventional metal current collector, metal burrs generated in an abnormal case such as nail penetration were relatively small, and a support layer of the composite current collector had larger short-circuit resistance, thereby improving nail penetration safety performance of the battery. It may be learned from the foregoing table that, the conventional battery had thermal runaway and destruction in the nail penetration case and could not pass the nail penetration safety test. All lithium-ion batteries using the composite current collector could pass the nail penetration safety test.

6.2 Effect of a Protection Layer on Improvement of Electrochemical Performance of a Composite Current Collector On the basis of the current collector of each example listed in Table 1, a protection layer was further formed to investigate the effect of a protection layer on improvement of the electrochemical performance of the composite current collector. The "positive electrode current collector 2-1" in Table 2 means a current collector obtained by forming a protection layer on the basis of the "positive electrode current collector 2" in Table 1. Numbers of other current collectors have similar meanings.

TABLE 2

| Electrode plate number | Current collector number | Upper protection layer Material | D3' | Lower protection layer Material | D3" |
|---|---|---|---|---|---|
| Positive electrode plate 2-1 | Positive electrode current collector 2-1 | Nickel oxide | 10 nm | Nickel oxide | 8 nm |
| Positive electrode plate 2-2 | Positive electrode current collector 2-2 | Nickel oxide | 50 nm | Nickel oxide | 30 nm |

Table 3 shows cycling performance data measured after a battery is assembled by using an electrode plate listed in Table 2.

TABLE 3

| Battery number | Electrode plate | | Capacity retention rate at 45° C. in the 1000$^{th}$ cycle |
|---|---|---|---|
| Battery 1 | Conventional negative electrode plate | Conventional positive electrode plate | 86.5% |
| Battery 2 | Conventional negative electrode plate | Positive electrode plate 2 | 80.7% |
| Battery 3 | Conventional negative electrode plate | Positive electrode plate 2-1 | 85.2% |
| Battery 4 | Conventional negative electrode plate | Positive electrode plate 2-2 | 85.4% |

As shown in Table 3, compared with the battery 1 using the conventional positive electrode plate and the conventional negative electrode plate, the battery using the composite current collector had good cycle life and had cycling performance equivalent to that of the conventional battery. Especially for a battery manufactured by using a current collector with a protection layer, compared with a battery manufactured by using a current collector without a protection layer, a capacity retention rate of the battery could be further improved, which indicates that the battery is more reliable.

6.3 Effect of a Conductive Primer Layer on Improvement of Electrochemical Performance of a Battery The following illustrates the effect of the conductive primer layer, composition of the conductive primer layer, and other factors on improvement of the electrochemical performance of the battery. Table 4 shows specific composition and related parameters of batteries and positive electrode plates and current collectors that are used in the batteries in various examples and comparative examples. Table 5 shows a performance measurement result of each battery.

TABLE 4

| Electrode plate number | Current collector number | Support layer Material | D1 | Conductive layer Material | D2 | Conductive primer layer | Electrode active material layer |
|---|---|---|---|---|---|---|---|
| Comparative positive electrode plate 20 | Positive electrode current collector 4 | PET | 10 μm | Al | 1 μm | / | NCM333, D50 9.8 μm, an active material layer with a thickness of 55 μm |
| Positive electrode plate 21 | Positive electrode current collector 4 | PET | 10 μm | Al | 1 μm | 10% conductive carbon black, 90% aqueous polyacrylic acid, with a thickness of 1.5 μm | Same as the above |
| Positive electrode plate 22 | Positive electrode current collector 4 | PET | 10 μm | Al | 1 μm | 20% conductive carbon black, 80% aqueous polyacrylic acid, with a thickness of 1.5 μm | Same as the above |
| Positive electrode plate 23 | Positive electrode current collector 4 | PET | 10 μm | Al | 1 μm | 50% conductive carbon black, 50% aqueous PVDF, with a thickness of 1.5 μm | Same as the above |
| Positive electrode plate 24 | Positive electrode current collector 4 | PET | 10 μm | Al | 1 μm | 65% conductive carbon black, 35% aqueous PVDF, with a thickness of 1.5 μm | Same as the above |

TABLE 4-continued

| Electrode plate number | Current collector number | Support layer Material | D1 | Conductive layer Material | D2 | Conductive primer layer | Electrode active material layer |
|---|---|---|---|---|---|---|---|
| Positive electrode plate 25 | Positive electrode current collector 4 | PET | 10 μm | Al | 1 μm | 80% conductive carbon black, 20% aqueous PVDF, with a thickness of 1.5 μm | Same as the above |
| Positive electrode plate 26 | Positive electrode current collector 4 | PET | 10 μm | Al | 1 μm | 99% conductive carbon black, 1% aqueous PVDF, with a thickness of 1.5 μm | Same as the above |
| Positive electrode plate 27 | Positive electrode current collector 4 | PET | 10 μm | Al | 1 μm | 65% conductive carbon black, 35% oily PVDF, with a thickness of 1.5 μm | Same as the above |
| Positive electrode plate 28 | Positive electrode current collector 4 | PET | 10 μm | Al | 1 μm | 80% conductive carbon black, 20% oily PVDF, with a thickness of 1.5 μm | Same as the above |
| Positive electrode plate 29 | Positive electrode current collector 4 | PET | 10 μm | Al | 1 μm | 32.5% conductive carbon black, 32.5% flake conductive graphite (D50 0.05 μm), 35% aqueous PVDF, with a thickness of 1.5 μm | Same as the above |
| Positive electrode plate 30 | Positive electrode current collector 4 | PET | 10 μm | Al | 1 μm | 65% conductive carbon black, 35% aqueous PVDF, with a thickness of 500 nm | Same as the above |
| Positive electrode plate 31 | Positive electrode current collector 4 | PET | 10 μm | Al | 1 μm | 65% conductive carbon black, 35% aqueous PVDF, with a thickness of 2 μm | Same as the above |
| Positive electrode plate 32 | Positive electrode current collector 4 | PET | 10 μm | Al | 1 μm | 65% conductive carbon black, 35% aqueous PVDF, with a thickness of 5 μm | Same as the above |

TABLE 5

| Battery number | Electrode plate | | DCR growth rate |
|---|---|---|---|
| Battery 20 | Comparative positive electrode plate 20 | Conventional negative electrode plate | 35% |
| Battery 21 | Positive electrode plate 21 | Conventional negative electrode plate | 30.9% |
| Battery 22 | Positive electrode plate 22 | Conventional negative electrode plate | 29% |
| Battery 23 | Positive electrode plate 23 | Conventional negative electrode plate | 20% |
| Battery 24 | Positive electrode plate 24 | Conventional negative electrode plate | 15% |
| Battery 25 | Positive electrode plate 25 | Conventional negative electrode plate | 14.5% |
| Battery 26 | Positive electrode plate 26 | Conventional negative electrode plate | 14% |
| Battery 27 | Positive electrode plate 27 | Conventional negative electrode plate | 18.5% |
| Battery 28 | Positive electrode plate 28 | Conventional negative electrode plate | 18.2% |
| Battery 29 | Positive electrode plate 29 | Conventional negative electrode plate | 12.9% |

TABLE 5-continued

| Battery number | Electrode plate | | DCR growth rate |
|---|---|---|---|
| Battery 30 | Positive electrode plate 30 | Conventional negative electrode plate | 15.5% |
| Battery 31 | Positive electrode plate 31 | Conventional negative electrode plate | 14.6% |
| Battery 32 | Positive electrode plate 32 | Conventional negative electrode plate | 14.1% |

It can be learned from the above test data that:

1. When a composite current collector with a relatively thin conductive layer (that is, the comparative positive electrode plate 20 without a conductive primer layer) was used, the battery had relatively large DCR and a relatively low cycle capacity retention rate due to shortcomings such as the composite current collector having poorer conductivity than a conventional metal current collector, and damage vulnerability of the conductive layer in the composite current collector. However, after a conductive primer layer was introduced, by effectively mending and constructing a conductive network among the current collector, the conductive primer layer, and the active material, the conductive primer layer helped to improve the electron transfer efficiency, and reduce the resistance between the current collector and the electrode active material layer, so that the DCR could be effectively reduced.

2. With an increase of the conductive agent content of the conductive primer layer (the positive electrode plates 21 to 26), the DCR of the battery could be greatly reduced.

3. Under the same composition, the aqueous binder could help to reduce the DCR more significantly than the oily binder (the positive electrode plate 24 vs. the positive electrode plate 27 and the positive electrode plate 25 vs. the positive electrode plate 28).

4. The flake graphite could generate "horizontal sliding", thereby achieving a function of buffering, reducing the damage to the conductive layer of the current collector during the compaction, and reducing cracks. Therefore, the flake graphite could further reduce the DCR of the battery (the positive electrode plate 24 vs. the positive electrode plate 29).

5. With the increase of the thickness of the conductive primer layer (the positive electrode plate 30 to the positive electrode plate 32), the DCR of the battery could be reduced more significantly. However, a too thick conductive primer layer was not conducive to the improvement of the energy density of the battery.

6.5 Effect of Small and Large Particles on Improvement of Electrochemical Performance of a Battery The following studies the effect of electrode active materials with different particle sizes in an electrode active material layer on improvement of the electrochemical performance of the battery. Table 6 shows the specific composition and related parameters of positive electrode plates and current collectors of batteries in examples. Table 7 shows a performance measurement result of each battery. In this application, although an electrode active material layer including electrode active materials with different particle sizes can be directly formed on a surface of a composite current collector, that is, no conductive primer layer is provided, in a preferred embodiment of this application, the effect of electrode active materials with different particle sizes on improvement of electrochemical performance of a battery is studied on the basis that a conductive primer layer is provided, to better study technical effects of the electrode active materials.

TABLE 6

| Electrode plate number | Current collector number | Support layer | | Conductive layer | | Conductive primer layer | Electrode active material layer |
|---|---|---|---|---|---|---|---|
| | | Material | D1 | Material | D2 | | |
| Positive electrode plate 41 | Positive electrode current collector 4 | PET | 10 μm | Al | 1 μm | 65% conductive carbon black, 35% aqueous PVDF, with a thickness of 1.5 μm | NCM811, D50, 6 μm Active material layer with a thickness of 55 μm, 3 wt % binder PVDF |
| Positive electrode plate 42 | Positive electrode current collector 4 | PET | 10 μm | Al | 1 μm | 65% conductive carbon black, 35% aqueous PVDF, with a thickness of 1.5 μm | 90% NCM811, D50, 6 μm 10% NCM523 D50, 12 μm Active material layer with a thickness of 55 μm, 3 wt % binder PVDF |
| Positive electrode plate 43 | Positive electrode current collector 4 | PET | 10 μm | Al | 1 μm | 65% conductive carbon black, 35% aqueous PVDF, with a thickness of 1.5 μm | 70% NCM811, D50, 6 μm 30% NCM523 D50, 12 μm Active material layer with a thickness of 55 μm, 3 wt % binder PVDF |
| Positive electrode plate 44 | Positive electrode current collector 4 | PET | 10 μm | Al | 1 μm | 65% conductive carbon black, 35% aqueous PVDF, with a thickness of 1.5 μm | 50% NCM811, D50, 6 μm 50% NCM523 D50, 12 μm Active material layer with a |

TABLE 6-continued

| Electrode plate number | Current collector number | Support layer Material | D1 | Conductive layer Material | D2 | Conductive primer layer | Electrode active material layer |
|---|---|---|---|---|---|---|---|
| Positive electrode plate 45 | Positive electrode current collector 4 | PET | 10 μm | Al | 1 μm | 65% conductive carbon black, 35% aqueous PVDF, with a thickness of 1.5 μm | thickness of 55 μm, 3 wt % binder PVDF 50% NCM811, D50, 6 μm 50% NCM811 D50, 12 μm Active material layer with a thickness of 55 μm, 3 wt % binder PVDF |
| Positive electrode plate 46 | Positive electrode current collector 4 | PET | 10 μm | Al | 1 μm | 65% conductive carbon black, 35% aqueous PVDF, with a thickness of 1.5 μm | 25% NCM811, D50, 6 μm 75% NCM523 D50, 12 μm Active material layer with a thickness of 55 μm, 3 wt % binder PVDF |
| Positive electrode plate 47 | Positive electrode current collector 4 | PET | 10 μm | Al | 1 μm | 65% conductive carbon black, 35% aqueous PVDF, with a thickness of 1.5 μm | NCM523 D50, 12 μm Active material layer with a thickness of 55 μm, 3 wt % binder PVDF |

TABLE 7

| Battery number | Plate composition | | Rate performance (discharge capacity retention rate at 4C) |
|---|---|---|---|
| Battery 41 | Positive electrode plate 41 | Conventional negative electrode plate | 72.8% |
| Battery 42 | Positive electrode plate 42 | Conventional negative electrode plate | 75.3% |
| Battery 43 | Positive electrode plate 43 | Conventional negative electrode plate | 79.5% |
| Battery 44 | Positive electrode plate 44 | Conventional negative electrode plate | 77.2% |
| Battery 45 | Positive electrode plate 45 | Conventional negative electrode plate | 77.5 |
| Battery 46 | Positive electrode plate 46 | Conventional negative electrode plate | 76.3% |
| Battery 47 | Positive electrode plate 47 | Conventional negative electrode plate | 73.2% |

It can be learned from the rate performance test results of batteries in Table 7 that when the electrode active materials were a mixture of small particle active materials (average particle size D50 of 1.0 μm to 7.0 μm) and large particle active materials (average particle size D50 of 7.1 μm to 20.0 μm), the rate performance of the batteries was better than that of batteries (battery 41) using small particle active materials alone or batteries (battery 47) using large particle active materials alone. Moreover, as shown in the above data, when the mass ratio of the small particle active materials to the large particle active materials fell within the range of 1:9 to 9:1, good improvement in rate performance could be obtained.

6.6 Effect of a Percentage of a Binder Contained in an Electrode Active Material Layer on Improvement of Electrochemical Performance of a Battery When the binder content of the electrode active material layer was high, the binding force between the active material layer and the current collector was strong, and when there was the conductive primer layer, the binding force between the whole sheet layer (that is, a collective term for the active material layer and the conductive primer layer) and the composite current collector was also strong. Therefore, in an abnormal case such as nail penetration, the active material layer (or the film layer) could effectively wrap the metal burrs generated in the conductive layer to improve the nail penetration safety performance of the battery.

The following illustrates the effects of the binder content in the electrode active material layer on improvement of the electrochemical performance of the battery from the perspective of the nail penetration safety of the battery.

The positive electrode plates were prepared according to the method described in the preceding examples, but the composition of the positive electrode active material layer slurry was adjusted to prepare a plurality of positive electrode plates with different binder contents in the positive electrode active material layer. The specific composition of electrode plates is shown in the table below. For ease of simplicity, an active material with one particle size was used herein.

TABLE 9

| Electrode plate number | Current collector number | Support layer Material | D1 | Conductive layer Material | D2 | Conductive primer layer | Electrode active layer material |
|---|---|---|---|---|---|---|---|
| Positive electrode | Positive electrode | PET | 10 μm | Al | 1 μm | 65% conductive carbon black, | NCM811, D50 6.5 μm, an |

TABLE 9-continued

| Electrode plate number | Current collector number | Support layer Material | Support layer D1 | Conductive layer Material | Conductive layer D2 | Conductive primer layer | Electrode active layer material |
|---|---|---|---|---|---|---|---|
| plate 33 | current collector 4 | | | | | 35% aqueous PVDF, with a thickness of 1.5 μm | active material layer with a thickness of 55 μm, 0.5 wt % binder PVDF |
| Positive electrode plate 34 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 1 wt % binder PVDF |
| Positive electrode plate 35 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 2 wt % binder PVDF |
| Positive electrode plate 36 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 3 wt % binder PVDF |

Table 10 shows nail penetration test results of the batteries assembled by using the foregoing different positive electrode plates. The results show that the higher binder content in the positive electrode active material layer, the better nail penetration safety performance of the corresponding battery. The binder content in the positive electrode active material layer was preferably not less than 1 wt %, more preferably, not less than 1.5 wt %, and most preferably, not less than 2 wt %.

TABLE 10

| Battery number | Electrode plate | Nail penetration test result |
|---|---|---|
| Battery 33 | Positive electrode plate 33 Conventional negative electrode plate | 1 passed, 9 failed |
| Battery 34 | Positive electrode plate 34 Conventional negative electrode plate | 6 passed, 4 failed |
| Battery 35 | Positive electrode plate 35 Conventional negative electrode plate | All passed |
| Battery 36 | Positive electrode plate 36 Conventional negative electrode plate | All passed |

6.7 Surface Morphology of the Composite Current Collector

Figure 8:
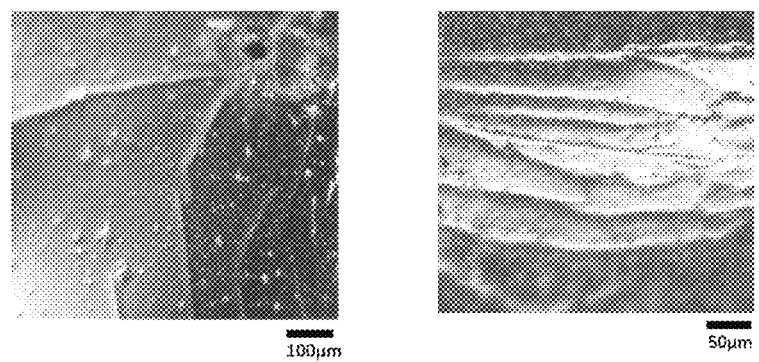
FIG. 8 is a microscopic observation diagram of a surface of a positive electrode current collector according to an embodiment of this application.

The applicant finds that in an electrode plate including a composite current collector, a surface of a conductive layer of the composite current collector is different from that of a traditional aluminum metal foil current collector, that is, the surface is prone to crack. For example, for positive electrode plate 24, after cold pressing, a small sample was taken, and a surface of the positive electrode plate 24 was cleaned by using a piece of dust-free paper dipped in a DMC solvent, so that a surface of a composite current collector could be exposed. Then a surface morphology was observed by using a CCD microscope instrument. Refer to FIG. 8 for an observation diagram of the surface morphology. An obvious crack can be seen in FIG. 8. This kind of crack is unique to the surface of the conductive layer of the composite current collector, and it is not observed on the surface of the traditional metal current collector. When the conductive layer of the composite current collector is thin, cracks are likely to occur under pressure in the cold pressing process of the electrode plate processing.

The electrode active material layer in this application included two types of active materials with different particle sizes, so that the damage to the conductive layer could be reduced in the roll-in process, thereby improving conductivity of the composite current collector and performance such as internal resistance and polarization of the battery, and then obtaining a positive electrode plate with small internal resistance and polarization and good electrochemical performance.

In addition, Under the condition of that there was a conductive primer layer, the conductive primer layer not only could further reduce the damage to the conductive layer, but also could, by effectively mending and constructing a conductive network between the current collector and the active material, improve the electron transfer efficiency, and reduce the resistance between the current collector and the electrode active material layer, thereby effectively reducing the internal direct current resistance in the electrode assembly, improving the power performance of the electrode assembly, and ensuring that the electrode assembly was not prone to phenomena of relatively large polarization and lithium precipitation during long-term cycling, that is, effectively improving the long-term reliability of the electrode assembly. Specifically, the DCR growth was significantly reduced, thereby improving the battery performance.

The foregoing observation result provides a possible theoretical explanation about a functional mechanism of the conductive primer layer, but it should be understood that this application is not limited to this specific theoretical explanation.

A person skilled in the art may understand that the foregoing shows an application example of an electrode plate in this application only by using a lithium battery as an example. However, the electrode plate in this application may also be applied to other type of electrochemical apparatus, and a good technical effect of this application can still be achieved.

According to the disclosure and teaching of this specification, a person skilled in the art of this application may further make appropriate changes or modifications to the foregoing embodiments. Therefore, this application is not limited to the foregoing disclosure and the described embodiments, and some changes or modifications to this application can also fall within the protection scope of the claims of this application. In addition, although some specific terms are used in this specification, these terms are used only for ease of description, and do not constitute any limitation on this application.

What is claimed is:

1. A positive electrode plate, comprising a current collector and an electrode active material layer disposed on at least one surface of the current collector, wherein the current collector comprises a support layer and a conductive layer disposed on at least one surface of the support layer, a single-sided thickness D2 of the conductive layer satisfies 30 nm≤D2≤3 μm, a thickness D1 of the support layer satisfies 1 μm≤D1≤30 μm, and the support layer is made of a polymer material or a polymer composite material; and the electrode active material layer comprises electrode active materials, a binder, and a conductive agent, and the electrode active materials comprise small particle active materials with an average particle size D50 of 1.0 μm to 7.0 μm and large particle active materials with an average particle size D50 of 7.1 μm to 20.0 μm, wherein D50 is a median particle size in volume distribution;

wherein a conductive primer layer is further disposed between the current collector and the electrode active material layer, the conductive primer layer comprises a conductive material and a binder, wherein the conductive material in the conductive primer layer comprises a conductive carbon material;

wherein a single-sided thickness H of the conductive primer layer is 0.1 μm to 5 μm, and a ratio of H to D2 is 0.5:1 to 5:1.

2. The positive electrode plate according to claim 1, wherein a mass ratio of the small particle active materials to the large particle active materials is 1:9 to 9:1.

3. The positive electrode plate according to claim 1, wherein a binder content of the electrode active material layer is not less than 1 wt %.

4. The positive electrode plate according to claim 1, wherein a protection layer is further disposed on a surface of the conductive layer of the current collector, the protection layer is disposed on only one surface of the conductive layer of the current collector or disposed on two surfaces of the conductive layer of the current collector; and a thickness D3 of the protection layer satisfies D3≤D2/10 and 1 nm≤D3≤200 nm.

5. The positive electrode plate according to claim 1, wherein the conductive layer is a metal conductive layer, and the metal conductive layer is made of at least one of aluminum, nickel, titanium, silver, and aluminum-zirconium alloy.

6. The positive electrode plate according to claim 1, wherein the thickness D1 of the support layer satisfies 1 μm≤D1≤15 μm.

7. The positive electrode plate according to claim 1, the conductive agent is made of at least one of a conductive carbon material and a metal material, wherein the conductive carbon material is selected from at least one of acetylene black, conductive carbon black, carbon nanotube, graphite, graphene, reduced graphene oxide and the metal material is selected from at least one of aluminum powder, iron powder, and silver powder.

8. The positive electrode plate according to claim 1, wherein the conductive primer layer further comprises an electrode active material.

9. The positive electrode plate according to claim 8, wherein the binder in the conductive primer layer is the same as or different from the binder in the active material layer.

10. The positive electrode plate according to claim 1, wherein the small particle active materials and the large particle active materials are different active materials.

11. The positive electrode plate according to claim 1, wherein a material of the support layer is selected from the group consisting of an insulation polymer material, an insulation polymer composite material, a conductive polymer material, a conductive polymer composite material, and any combination thereof, wherein, the insulation polymer material is selected from the group consisting of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), ethylene propylene rubber, polyoxymethylene, epoxy resin, phenolic resin, polytetrafluoroethylene, polyphenyl sulfide, polyvinylidene fluoride, silicone rubber, polycarbonate, cellulose or a derivative thereof, starch or a derivative thereof, protein or a derivative thereof, polyvinyl alcohol or cross-linked product thereof, polyethylene glycol or a cross-linked product thereof, and any combination thereof;

the insulation polymer composite material is a composite material formed of an insulation polymer material and an inorganic material, wherein the inorganic material is selected from the group consisting of a ceramic material, a glass material, a ceramic composite material, and any combination thereof;

the conductive polymer material is selected from the group consisting of a polysulfur nitride polymer material, a doped conjugated polymer material, and a combination thereof;

the conductive polymer composite material is a composite material formed of an insulation polymer material and a conductive material, wherein, the conductive material is selected from the group consisting of a conductive carbon material, a metal material, a composite conductive material, and any combination thereof; the conductive carbon material is selected from the group consisting of carbon black, carbon nanotube, graphite, acetylene black, graphene, reduced graphene oxide, and any combination thereof; the metal material is selected from the group consisting of nickel, iron, copper, aluminum, and any combination thereof; and the composite conductive material is selected from the group consisting of nickel-coated graphite powder, nickel-coated carbon fiber, and a combination thereof.

12. The positive electrode plate according to claim 1, wherein a room-temperature Young's modulus of the support layer satisfies 20 GPa≥E≥4 GPa.

13. The positive electrode plate according to claim 1, wherein the single-sided thickness D2 of the conductive layer satisfies 300 nm≤D2≤2 μm.

14. The positive electrode plate according to claim 1, wherein the binder is selected from the group consisting of styrene butadiene rubber, oily polyvinylidene fluoride (PVDF), polyvinylidene fluoride copolymer, sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, polyacrylate-polyacrylonitrile copolymer, and any combination thereof.

15. The positive electrode plate according to claim 1, where the binder in the conductive primer layer is selected from the group consisting of styrene butadiene rubber, oily polyvinylidene fluoride (PVDF), polyvinylidene fluoride copolymer, sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, polyacrylate-polyacrylonitrile copolymer, and any combination thereof.

16. The positive electrode plate according to claim 1, wherein the conductive agent in the electrode active material layer comprises at least one of a carbon conductive material and a metal material.

17. The positive electrode plate according to claim 1, wherein the conductive carbon material of the electrode active material layer and the conductive primer layer is each independently selected from the group consisting of acetylene black, conductive carbon black, carbon nanotube, graphite, graphene, reduced graphene oxide, and any combination thereof.

18. The positive electrode plate according to claim 15, wherein the metal material is selected from the group consisting of aluminum powder, iron powder, silver powder, and any combination thereof.

19. An electrochemical apparatus, comprising a positive electrode plate, a negative electrode plate, a separator, and an electrolyte, wherein the positive electrode plate is the positive electrode plate according to claim 1.

20. An apparatus, comprising the electrochemical apparatus according to claim 19.

* * * * *